United States Patent [19] [11] Patent Number: 4,542,883
Rutzki [45] Date of Patent: Sep. 24, 1985

[54] DEVICE FOR TENSIONING STRAPS

[76] Inventor: Edith Rutzki, Wilhelmstrasse 23, D-6901 Dossenheim-Heidelberg, Fed. Rep. of Germany

[21] Appl. No.: 548,883
[22] PCT Filed: Feb. 4, 1983
[86] PCT No.: PCT/DE83/00018
§ 371 Date: Oct. 3, 1983
§ 102(e) Date: Oct. 3, 1983
[87] PCT Pub. No.: WO83/02754
PCT Pub. Date: Aug. 18, 1983

[30] Foreign Application Priority Data
Feb. 4, 1982 [DE] Fed. Rep. of Germany ....... 3203750

[51] Int. Cl.$^4$ .......................... B21F 9/00; B25B 25/00; B66D 1/14
[52] U.S. Cl. .................................... 254/217; 254/223; 254/369; 24/68 CD; 140/123.5
[58] Field of Search ............... 254/217, 218, 235, 237, 254/238, 369, 223; 24/68 CD, 68 A, 68 CT, 71 T, 265 CD; 140/93.2, 123.5

[56] References Cited
U.S. PATENT DOCUMENTS

| 1,833,168 | 11/1931 | MacChesney et al. | 254/217 |
| 2,594,891 | 4/1952 | Embree | 254/217 |
| 2,881,636 | 4/1959 | Palmleaf | 254/213 X |
| 2,969,221 | 1/1961 | Harmes | 254/218 |
| 3,175,806 | 3/1965 | Prete | 24/68 CD X |
| 3,180,623 | 4/1965 | Huber | 24/68 CD |
| 3,602,065 | 8/1971 | Ratcliff | 254/369 X |
| 3,718,315 | 2/1973 | Huber | 24/68 B |
| 3,749,366 | 7/1973 | Brucker | 24/68 CD |
| 4,168,041 | 9/1979 | Moosberg | 242/84.51 R |
| 4,199,182 | 4/1980 | Sunesson | 24/68 CD X |
| 4,218,046 | 8/1980 | Bathum et al. | 254/369 X |
| 4,227,286 | 10/1980 | Holmberg | 254/218 X |
| 4,283,722 | 8/1981 | Kito et al. | 254/369 X |

FOREIGN PATENT DOCUMENTS
2407097 5/1979 France .
2424152 11/1979 France .
2443616 7/1980 France .
2028449 3/1980 United Kingdom .

Primary Examiner—Stuart S. Levy
Assistant Examiner—Joseph J. Hail, III
Attorney, Agent, or Firm—Sughrue, Mion, Zinn, Macpeak & Seas

[57] ABSTRACT

A tensioner for straps, especially for systems for keeping loads in position, has an anchoring means for the fixed end of the strap and a strap drum worked by a ratchet, the drum then acting as a winch for tensioning the strap. The drum has a locking pawl that may be moved clear of it. The tensioning ratchet has tooth means on the side of the strap drum so that a driving pawl fixed on the ratchet lever and loaded towards the strap drum by a spring, may be put into driving connection with the tooth means. The ratchet lever further has means limiting the torque that may be transmitted to the tooth means on operation of the ratchet lever by having the driving pawl spring-pre-loaded tangentially in relation to the strap drum. In keeping with another possible design the ratchet is made in two parts that are separated in the length direction of the ratchet lever and are joined together by a mechanism which makes the ratchet lever foldingly give way when the torque acting on the free end of the ratchet lever is greater than a limiting lever. The tensioner may be simply taken to pieces for replacement of its parts.

15 Claims, 9 Drawing Figures 4,542,883

DEVICE FOR TENSIONING STRAPS

BACKGROUND OF THE INVENTION

The present invention relates to a tensioner for straps and especially to such tensioners for use in systems for keeping loads in position, with an anchoring means for the fixed end of the strap and with a tightening ratchet for working a strap drum, that is designed for acting as a winch and has a locking pawl that may be moved clear of it.

It has been seen from experience that when the straps of load securing systems are done up with such a tensioner they are frequently overly loose or overly tight so that in the first case there is a chance of the load slipping out of position, whereas in the second case there is a chance of the load being damaged or of the straps being torn.

SUMMARY OF THE INVENTION

For this reason one purpose of the present invention is that of designing a strap tensioner of the sort noted hereinbefore, in which the torque taking effect on the strap drum on tensioning the same is limited to a maximum value so that the tightening operation may in each case be undertaken till this torque is produced. This purpose is effected in keeping with the present invention inasfar as the tightening ratchet has tooth means on the side of the strap drum so that a driving pawl, that is fixed to the ratchet lever and is more especially pre-loaded by a spring towards the axis of the strap drum by spring means, may be put in driving connection with the said tooth means, and the ratchet lever has means limiting the torque transmitted to the tooth means on working the ratchet lever. Such a design of the strap tensioner in keeping with the invention is sturdy and simple in structure, that may nevertheless be used quite safely even under rough working conditions.

In keeping with a first form of the strap tensioner, the driving pawl is able to be moved, is placed tangentially in relation to the strap drum and is springingly pre-loaded in the tensioning direction tangentially in relation to the strap drum so that on going past a torque level, as produced by the ratchet lever on the strap drum, the driving pawl gives way, it then slipping over the tooth means on the strap drum without driving same any further. Herein the wording "tensioning direction" is used in the sense of that direction, in which the strap drum is turned and the strap is tensioned when the ratchet lever is moved in this direction. It is best if the pre-loading effect on at least one spring, with which the driving pawl is pre-loaded tangentially towards the strap drum, is adjustable. An especially useful effect is to be accomplished if the turning of the ratchet lever and of the strap drum are the same, this provides better conditions for control over the full tensioning range.

As part of a further form of the invention, that is especially of value, the ratchet lever has a division along its length direction into two parts that are joined together by a mechanism causing a bending of the ratchet lever when there is a torque greater that a certain torque at the free end of the ratchet lever. In this respect the user will then clearly be able to see that he has got to the maximum torque by such folding or giving away and he will not undertake any further fruitless attempts at further tightening the strap by using the strap tensioner.

The part of the ratchet lever nearer to the strap drum is best made with at least the same length as the part thereof further from the said strap drum, and especially is up to 20% longer than it.

A useful effect has been produced by making the ratchet lever of two arms with a spacing therebetween at least equal to the width of the strap, said arms being joined together at their free ends by a handle and being joined together at the point of division by the mechanism for limiting the torque.

Within the framework of a preferred form of the invention, this mechanism has a pin joined rigidly with the outer part of the ratchet lever and having at one point a polygonal cross section onto which a sleeve is seated so that it may be moved in the length direction. The sleeve is pre-loaded in one direction and its end facing in the direction of such pre-loading has a tooth means kept in mesh with an opposite tooth means therefor on a counter-element rigidly joined on the inner part of the ratchet lever so that on going up over the limiting or critical torque value the two parts of the ratchet lever give way and are folded in relation to each other inasfar as one of the tooth means is moved in relation to the other.

The counter-element is best fixed to the inner part of the one of the lever arms by way of a polygonal male-female connection with the inner part. A useful effect has been produced if there is a tube-like sleeve on the element running as far as the opposite arms and there is a spring in the element pre-loading the sleeve towards the counter-element.

This spring is best placed round the pin. If the tube-like sleeve has a take-up stop (that may be moved in the length direction of the sleeve and locked in position) at its end furthest from the counter-element for the spring, the pre-loading effect of the spring, and for this reason the level of the torque able to be transmitted to the strap drum, may be adjusted.

In keeping with an especially useful further development of the invention, there is an acoustic warning device that is actuated on going over a certain upper limiting torque, that has been adjusted for. The warning device is best made with a bell worked by a change in position of the sleeve. Furthermore, a useful effect is to be had if the bell has a tongue fixed on the sleeve, while the body of the bell or sounding body to be acted upon by the tongue is placed between the arms of the ratchet lever, the bell body then functioning as a housing for the mechanism controlling or causing folding of the ratchet lever. This folding of the ratchet lever is a further useful effect. The system is especially handy if the bell body is centered on the shaft and has a driving element running out radially opposite the tongue. The sounding or bell body is best fixed to the one arm of the ratchet lever. For simpler resetting of the ratchet lever after folding or collapse thereof when the torque has gone over the maximum value, the tooth flanks of the tooth means taking effect in the tensioning direction are steeper than the flanks coming into play in the opposite direction.

In view of the fact that, whatever care is taken, rough use of the strap tensioner is likely to be responsible for damage to some parts, a further point in connection with the present invention is that the strap tensioner is to be so designed that its parts may be readily replaced. In particular, if the tensioner is used for military purposes, this is likely to be a very important point. To this end, in keeping with a special form of the invention, the strap drum is made up of at least two rod-like elements so kept in place at their two ends in cutouts in disks that their outer faces are in line with a circular cylinder, and between the elements, at least in the part between by the disks, there is a gap forming a connection between two positions of the generatrix of the circular cylinder so that the strap may be threaded through the gap. The rod-like elements are best designed so that their outer faces are like segments of a circular cylinder and are so kept in position such that their outer faces are lined up with a circular cylinder centered on the axis of turning of the strap drum. The elements may be usefully made up of two cylinders with cross sections in keeping with circular segments and with rounded-off ends so that each of the segments makes an angle of about 140° to 160° about the axis of turning of the strap drum and especially an angle of about 150°. At least one of the disks is responsible for keeping the rod-like elements in place. Both of the disks have the tooth means thereon used by the ratchet lever for turning the strap drum.

The design may be made especially simple if the outer faces of the rod-like elements are turningly taken up in two in-line holes running normal to the length direction of the strap drum and made in the frame supporting the parts of the strap tensioner. The rod-like elements are in this respect locked in position at points outside the holes by a cotter pin. The cotter pin is kept from slipping out of position by a spring ring.

Furthermore, the design may be made even simpler if the arms of the ratchet lever have holes with a diameter the same as the diameter of the circular cylinder as formed by the outer faces of the rod-like elements. These holes make it possible for the arms of the ratchet lever to be slipped over and onto the rod-like elements so that the ratchet lever may be rocked about the axis of turning of the strap drum.

The design becomes especially compact if the disks are placed outside the holes in the frame and the arms of the ratchet lever are outside the disks on the rod-like elements.

A useful effect is to be had if the frame is made of a length of sheet metal with a u-cross section which at the one end between the sides of the u-cross section has the means for anchoring the fixed or unmoving end of the strap and at the opposite end of the sides of the u-cross section has the holes forming bearings for the rod-like elements.

The frame may be designed with cam faces of such a size that after a given, designed-for tensioning motion of the ratchet lever of roughly 120° as measured from its starting point, they make the driving pawl of the ratchet some clear of the tooth means before further motion takes place. Because of this effect the strap drum is simply freed at a desired position.

A further useful effect is produced if the driving pawl is guided in slots running along and in the arms of the ratchet lever and on the outside has lugs or hooks running out from the arms and snapping into place to the back of the locking pawl when the strap tensioner is in a shut position for helping in pressing the locking pawl in the direction of locking thereof and so keeping the system from being unlocked by being opened up by some chance effect. Furthermore the spring-loaded locking pawl is best guided in slots running along and in the frame on the side of the strap drum facing the anchoring means for the fixed strap end, the locking pawl then best being designed running out sideways past the frame so that a cam face, positioned on at least one arm of the ratchet lever (on the side thereof facing away from the handle in terms of the position of the axis of turning) may be used for forcing the locking pawl into a position clear of the tooth means when the tensioner is moved into its most widely opened up position. Operation becomes especially simple if the driving pawl has a handle for moving it, such handle running up as far as the top edge of the ratchet lever, this then making it simpler to get the lug or hook clear of the locking pawl for opening up the strap tensioner.

BRIEF DESCRIPTION OF THE DRAWINGS

Further details of the invention will be seen from the figures herein that are of a preferred form of the invention.

DESCRIPTION OF THE PREFERRED EMBODIMENTS

Figure 1:
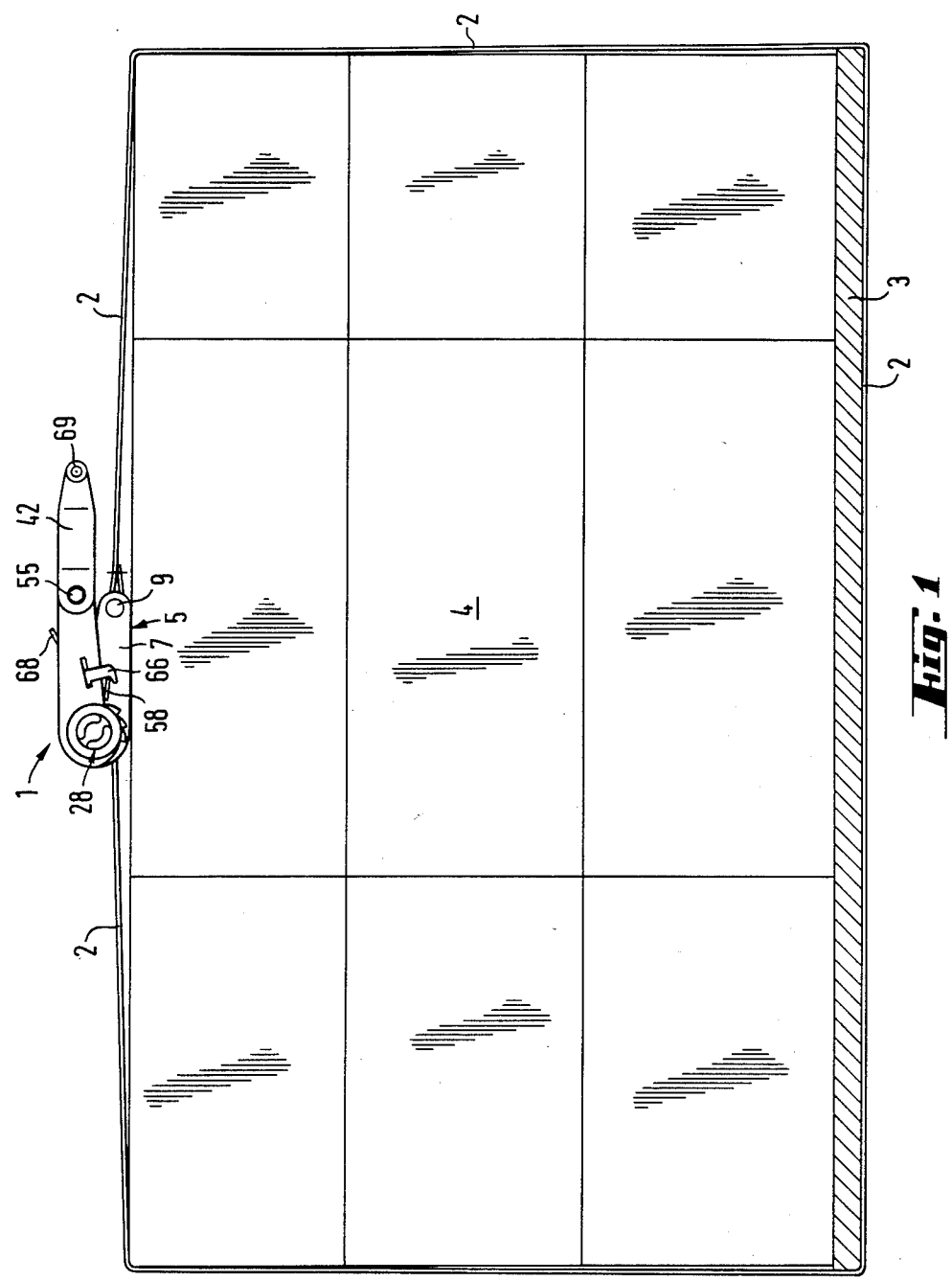
FIG. 1 is a side view of a working example of the tensioner to make clear use thereof for doing up a stack of square goods on a palette.
Figure 2:
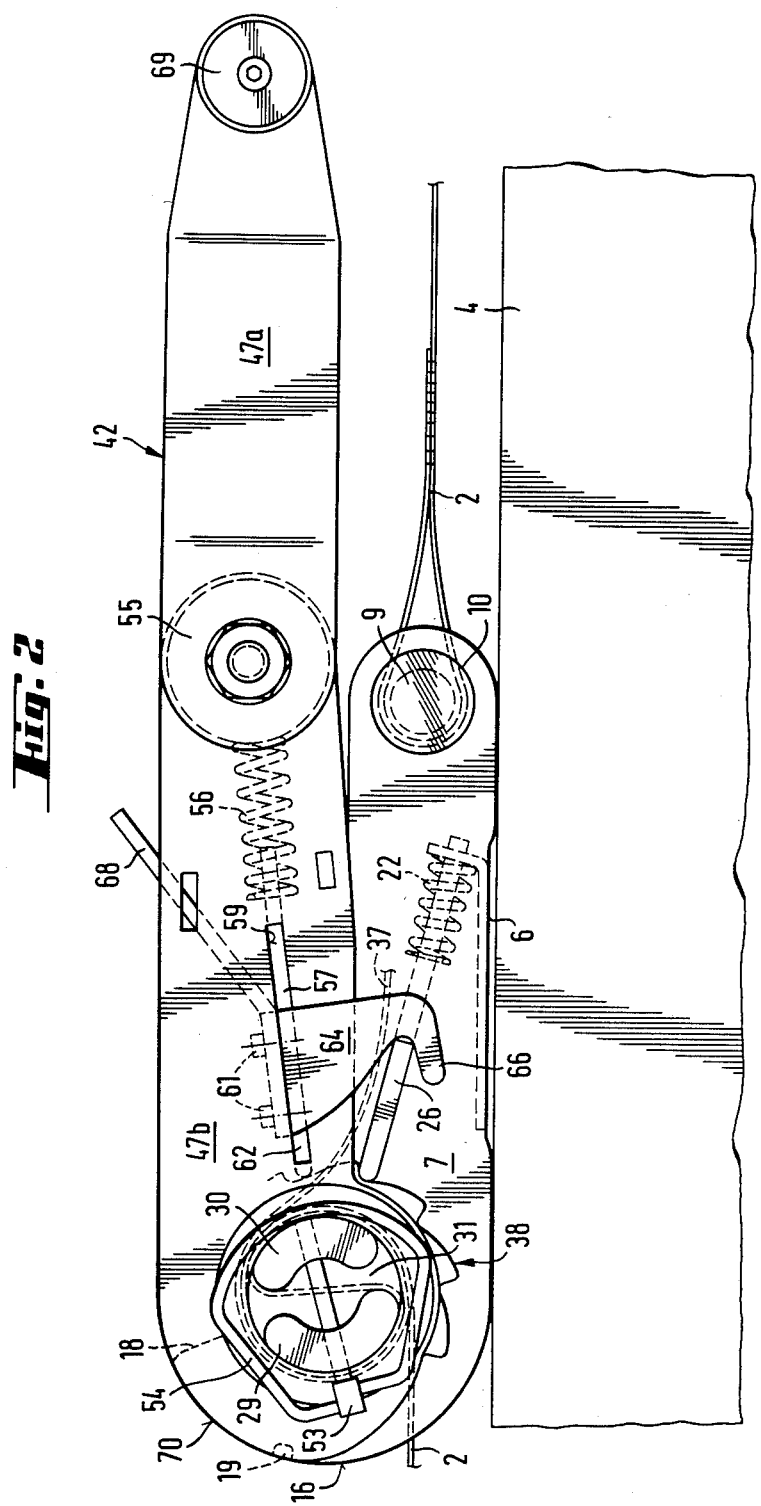
FIG. 2 is a side view of the tensioner of FIG. 1 on a larger scale in the tensioned condition.

In FIG. 1 the reader will see a strap tensioner 1 joining together the two ends of a strap 2, which in the present example has been lashed around a palette 3 and a stack of block-like goods 4 thereon to keep them safely in place. The tensioner 1 is made up of a frame 5 in the form of a length of sheet metal with a u-like cross section, the base 6 of the section being relatively short with two sides 7 and 8 projecting therefrom to the front and the back. As shown in FIG. 2, at one end of the sides of the u-section there are lined-up holes taking up a cross piece 9 having a flat head 10 at one end resting on the outer face of the side 7 of the U section, whereas its opposite end has a hole through it to take up a cotter pin 11 (see FIG. 5), at after a washer 12 has been slipped thereover and placed against the outer face of the section side, the cross piece 9 forming an anchoring means for the fixed or unmoving end 13 of the strap.

At the opposite ends of the sides 7 and 8 of the U section there are lined-up round holes 14 and 15 with a diameter the same as that of the strap drum so that the axis of turning of the drum goes through the centers of such holes. The holes 14 and 15 are higher up than the hole made for the cross piece 9, the lower limit of such holes being generally on the level with the middle point of the cross piece 9. For this reason, the height of the u-section sides 7 and 8 become less from the back end with the anchoring means for the fixed end 13 of the strap 2 on it to the front end with the holes 14 and 15 in it, the front end faces being designed as cam faces 16 and 17 running, after a part 18, generally radial in relation to the axis of turning D—D and running over the front edge of the holes 14 and 15, roughly in a curved form circularly about the axis of turning D—D as the center as far as the lower edge of the frame 5, there being at this point in each case a groove or notch 19 and 20 generally on a level with the axis of turning.

At its back end, and more or less half way between the sides 7 and 8 of the section, the base 6 has an upwardly bent ledge 21 acting as a support for a spring 22 forcing a locking pawl 23 towards the holes 14 and 15, the locking pawl 23 running in slots 24 and 25 in the sides 7 and 8 of the u-cross section that are radial in relation to the holes 14 and 15 and come to an end some distance short of the holes. Running outwards from the back part, generally completely taking up the space between the section sides 7 and 8, of the locking pawl 23, there are wings 26 and 27 running through the slots 24 and 25 in a outward direction so as to be markedly clear thereof. The front edges of the wings 26 and 27, and furthermore their back edges, are normal to the sides 7 and 8 of the section. The slots 24 and 25 and the locking pawl 23 are of such a size that the locking pawl 23 may be slipped into position through the slots in the frame 5.

The strap drum 28 is formed by two half cylinders 29 and 30 that are cylindrically circular-segment-like in cross section and have rounded off ends such that the outer faces of the cylinders are segments of a circular segment with a radius the same as the radius of the holes 14 and 15. The half cylinders 29 and 30 are longer than the distance between the sides 7 and 8 of the u-section and may be slipped loosely thereinto. There are two round disks 31 and 32 with cutouts 33 and 34 answering to the cross section of the two half cylinders. The disks are positioned so that their outer edges are on a circle with a diameter equal to the radius of the holes 14 and 15, the cutouts 33 and 34 being diametrally opposite on said circle. The round disks 31 and 32 are slipped onto the free ends of the cylinders 29 and 30 with a close fit at points outside the sides 7 and 8 of the cross-section. The outcome of this placing of the parts is that the outer faces of the cylinders 29 and 30 are in contact with the limits of the holes 14 and 15, thus forming bearing faces for the strap drum. Placing spring washers between the section sides 7 and 8 and the disks 31 and 32 will stop any damage caused by the rubbing effect of the round disks on the section sides. Between the cylinders 29 and 30 there is a gap 35, running right through, between the sides 7 and 8. The loose end 37 of the strap may be threaded through this gap 35 at the start of a tensioning operation. The round disks 31 and 32 have tooth means 38 and 39 at their radial end faces so as to give a ratchet function. The tooth flanks 40 facing the locking pawl 23 are steep and roughly radial in relation to the axis of turning D—D. On the other hand, the tooth flanks 41 facing away from the locking pawl are less steep and have a direction component that is clearly tangential in relation to the strap drum. Furthermore, a ratchet lever 42 is supported by said bearing faces so that it may be rocked about the axis of turning D—D. The ratchet lever 42 is made up of two arms 47 and 48 having holes 43 and 44 at their inner ends so that such inner ends may be slipped onto the cylinders 29 and 30 to the outside of the round disks 31 and 32. There are spring washers 45 and 46 between the arms 47 and 48 and the round disks 31 and 32. The holes 43 and 44 are made so that the ratchet lever 42 is supported by the outer faces of the cylinders 29 and 30 and the ratchet lever may be slipped over the outer faces thereof with a sliding and supporting function. Lastly, there are washers 49 and 50 which are slipped onto the free ends of the cylinders 29 and 30. On the outside of the washers 49 and 50 a cotter pin 52 is placed through two radial holes passing through the free ends of cylinders 29 and 30, wherein the holes are in a line. The cotter pin has a head 53 at its back end and the ends of a spring ring 54 are fixed to the head. The ring 54 is of such a size that, as is to be seen in FIGS. 2, 3, 4, and 9, it may be opened out and slipped over the cylinder at a point spaced from the head 53.

The ratchet lever 42 is made in two parts joined together between the ends of the lever, that is to say the arm 47 is made up of an outer part 47a and an inner part 47b and the arm 48 is made up of an outer part 48a and an inner part 48b. The inner parts of the arms 47b and 48b, that are journaled as we have seen for turning about the axis of turning D—D of the strap drum 28, are placed parallel to each other. At their free ends they have a mechanism 55 (of which a more detailed account is still to be given) forming such a connection between the free ends of the two inner parts 47b and 48b on the one hand with the inner ends of the outer parts 47a and 48a of the ratchet lever 42 that this connection between the inner and outer parts 47a and 47b and 48a and 48b is stiff and load bearing up till a certain acting torque of the ratchet lever 42 but when the torque goes over a given limiting value the outer parts 47a and 48a give way and are folded in relation to the inner parts 47b and 48b. There is a spring 56 acting on the mechanism 55 to give a pre-loading effect at the back driving part 57 of a driving pawl 58 so that thereby the driving pawl 58 is pre-loaded towards the strap drum 28. In the inner parts 47b and 48b of the ratchet lever 42 there are lengthways slots 59 and 60 that are so placed as to be running radially in, the direction of the axis turning D—D whatever position the ratchet lever 42 is moved into. The back driving part 57 acted upon by the spring 56 of the driving pawl 58 is joined by screws 61 to right angle brackets 62 and 63 so that it may be undone therefrom, the brackets having a driving part in each case more or less parallel to the axis turning D—D with the outer edges of the driving part placed inside the arms 47 and 48 and being kept on the tooth means 38 of the strap drum 28 or on the cam faces 17 and 18 (or in grooves 19 and 20 therein) by the force of a spring 56. The brackets 62 and 63 are placed so that side heads thereon are run through the slots 59 and 60, the heads outside the slots having the parts 64 and 65 that are bent through 90° round out of the plane of FIG. 2, such parts 64 and 65 run along next to the outer faces of the arms 47 and 48 and are parallel to them. The bent round parts furthermore have lugs or hooks 66 at their ends that are out of view in FIG. 2, such hooks 66 and 67 pointing towards the strap drum 28. A handle 68, bent upwards out of the plane of FIG. 2, is joined by the screws 61 to the driving pawl 68, thereby making it simple for the driving pawl 68 to be pulled back against the force of the spring 56.

At the outer parts 47a and 48a the arms 47 and 48 are bent round outwards so as to have enough space for the user of the tensioner to put his hand in for gripping a connection part 69 joining the outer ends 78 of the arms 47 and 48 together.

Figure 3:
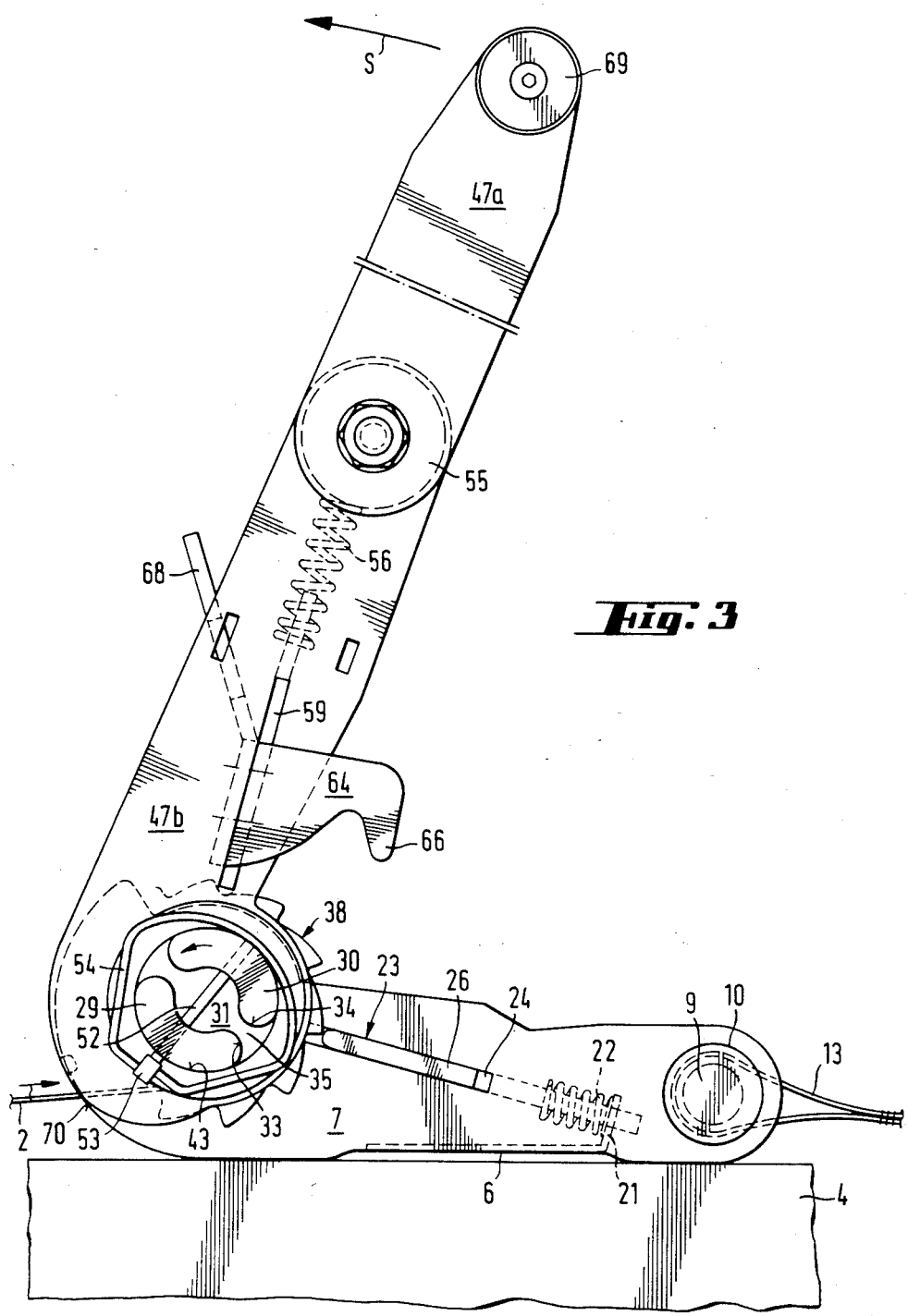
FIG. 3 is a further side and broken away view of the tensioner of FIG. 1 in the process of being tensioned.
Figure 4:
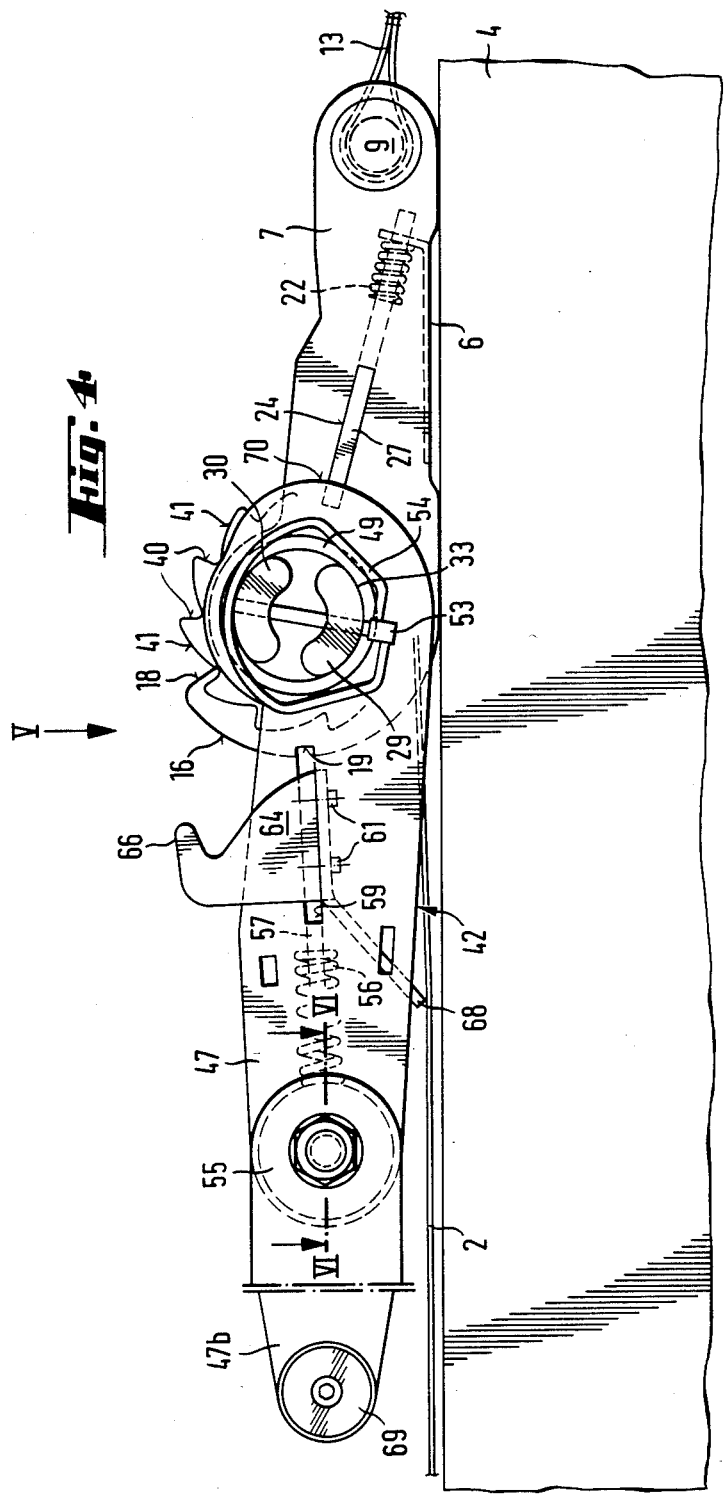
FIG. 4 is again a broken away view of the tensioner of FIG. 1 on a smaller scale than in FIGS. 2 and 3 in the opened up position in which the strap is free of strain.
Figure 5:
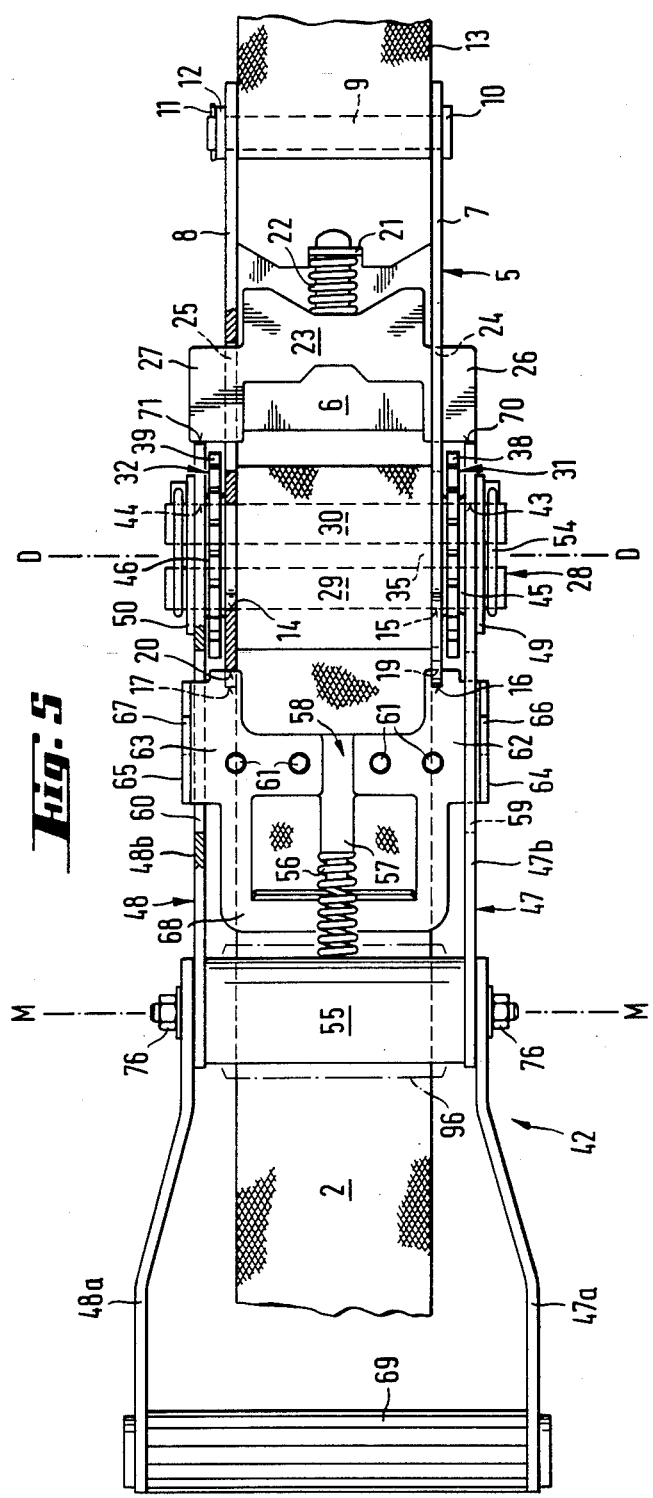
FIG. 5 is a plan view looking in the direction of the arrow V of FIG. 4 of the tensioner of this figure in a position in which the strap tension is let off.

The end of the arms 47 and 48 is in the form of a rounded off cam face 70 and 71 acting on the outer edges of the wings 26 and 27 of the locking pawl 23 and moving the pawl clear of the tooth means 38 and 39 of the strap drum 28 when the ratchet lever is moved out of the position illustrated in FIG. 3 into the position viewed in FIGS. 4 and 5, the strap drum then freely turning and letting off the tension.

Figure 6:
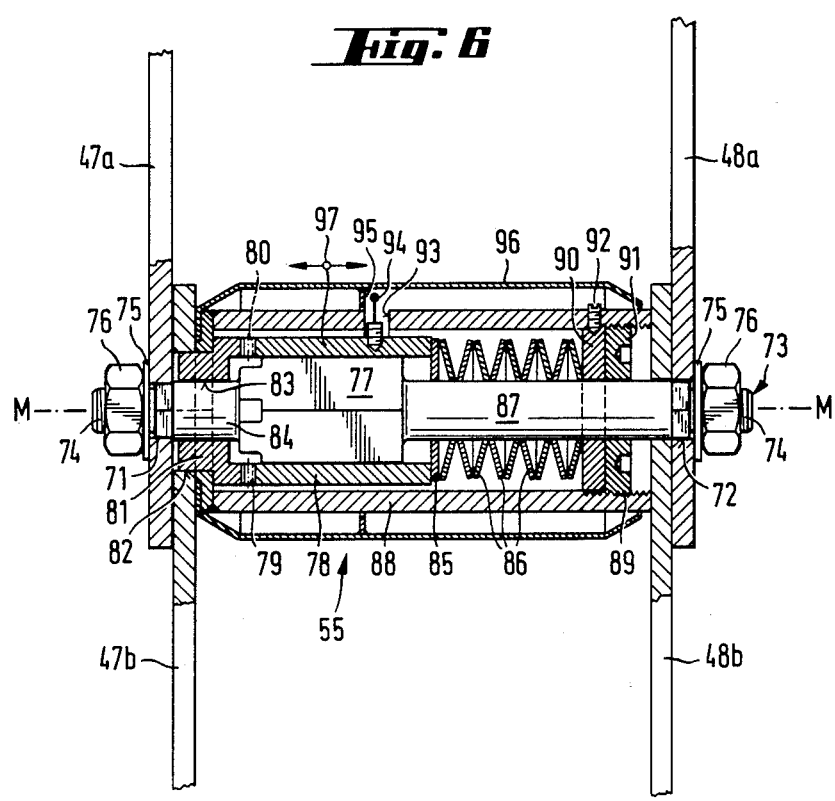
FIG. 6 is a lengthways section taken on the line VI—VI of FIG. 4 through a mechanism on the ratchet lever for limiting the torque and forming a connection between an outer and an inner part of the ratchet lever.

In the cross section of FIG. 6 the reader will be able to see the details of the torque limiting mechanism 55. At the ends furthest from the handle 68 of the outer parts 47a and 48a of the arms 47 and 38 there is in each case a polygonal hole 71 and 72, such holes being in line with each other and in fact centered on a middle axis M—M. There is a pin 73 running between and through the two polygonal holes and having end cross sections answering to the forms of the holes. The outermost end parts of the pin 73 have threads 74 onto which washers 75 are placed and nuts 76 are screwed. In the part between the outer parts 47a and 48a of the arms 47 and 48 and next thereto the pin 73 has a body part with a round cross section and a thicker cylinder part which has a square cross section. On the outer face of the part 77 there is a sleeve 78 sliding along the pin 73, the sleeve 78 having a hole therethrough with the same form as the outer face of the pin. The end of the sleeve 78 to be seen on the left in FIG. 6 has a tooth means in the form of a castellation 79 locking with a matching tooth means or castellation 80 made on the end of counter-element 81. The counter-element 81 is placed into a hole 82 at the free end of the inner part 47b of the arm 47 and rigidly joined thereto. Furthermore, the counter-element 81 has a hole 83 through it to take up a part 84 of the pin 73 running between the part 77 and outer part 47a of the arm 47, the pin 73 and the outer face of the part 84 forming a joint whose two parts are able to be rocked in relation to each other about the axis M—M.

At the end of the sleeve 78, furthest from the castellation 79, is placed a disk 85 which is acted upon by a stack of belleville washers 86 placed around the part 87 of the pin running as far as the outer part 48a of the arm 48 and having a round cross section. A tube-like sleeve 88 is placed concentrically around the pin, the counter-element, the castellations 79 and 80, the sleeve 78, the disk 86 and the belleville washers so as to be running as far as the inner face of the inner part 48b of the arm 48 against which it rests over a large part of its head area. The sleeve 88 is kept in position by the counter-element 81. In the end part next to the part 48b the tube-like sleeve 88 has a female screw thread 89 into which disks 90 and 91 with male threads are screwed. The disk 90, acting against the outermost belleville washer, may be secured backwards and forwards for adjustment of the degree of compression of the belleville washers 86, this controlling the pre-loading effect on the sleeve 78. The disk 91 and a locking screw 92 keep the parts in position after adjustment has been made.

The tube-like sleeve 88 has a slot 93 stretching part of the way round it over the sleeve 78 and there is a bell tongue 94 running through the slot and fixed to the sleeve 78 by a thin piece of spring wire. The tongue 94 is designed for acting against the inwardly running wall 95 of a sounding or bell body 96 at once when the sleeve 78 is moved against the force of the belleville washers 86, something that takes place when the turning force acting on the ratchet lever 42 goes over a certain value. The bell body 96 is gripped between the tube-like sleeve 88 and the inner part 47b of the arm 47 so as to be stretching in the form of a cylindrical housing as far as a point near the inner part 48b of the arm 48. The motion of the sleeve 78 is marked by a two-headed arrow.

Figure 7:
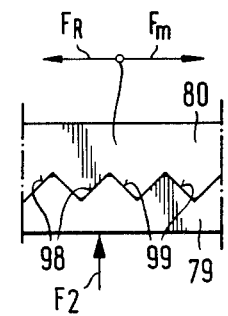
FIG. 7 is a diagrammatic view of one example for the locking tooth means of the mechanism to be seen in FIG. 6, in which the upwardly and downwardly running tooth flanks have the same angle.
Figure 8:
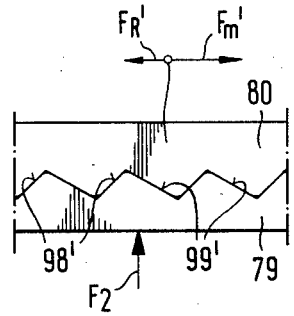
FIG. 8 is a diagrammatic view of a further example of the locking tooth means of the mechanism viewed in FIG. 6 with the upward and downward tooth flanks at different angles so that less force will be needed for resetting the ratchet lever.

FIG. 7 is a diagrammatic view of one working example for the design of the tooth means 79 and 80 fitting together, in the case of which the upward tooth flank 98 and downward flanks 99 have the same angle. The arrow F2 is used for marking the pre-loading force coming from the belleville washers 86 and forcing the two tooth means 79 and 80 together, the arrows $F_m$ and $R_r$ marking the force having to take effect in the direction of the arrows for a given pre-loading effect $F_2$ in order to make motion of the tooth means 79 and 80 in relation to each other take place. That is to say that the mechanism 55 goes on transmitting a turning force produced by the user acting on the connection piece 69 and the ratchet arm to the strap drum 28 till the forces get to the force levels $F_r$ and $F_m$, the force level $F_m$ in this respect limiting the torque supplied in the tensioning direction S, because when the force becomes greater than this value the ratchet lever 42 gives way and is folded round the axis M—M. For resetting the ratchet lever 42 in a position, in which the outer parts 47a and 48a of the arm 47 and 48 are again in line with their inner parts 47b and 48b the force needed has to be equal to at least $F_r$, which in the example of FIG. 8 is equal in value to the force $F_m$. The force needed for resetting may be decreased if, as marked in FIG. 8, the upward tooth flanks 98' are steeper than the downward tooth flanks 99', as will be clear for the lengths of the arrows $F_r'$ and $F_m'$ used in respect thereof.

The further account is now addressed to the workings of the example of the strap tensioner to be seen in FIGS. 1 to 8. Assume that the tensioner is in the starting position of FIG. 2 with the free end 37 of the strap 2 threaded very far between the cylinders 29 and 30 and coiled on the strap drum 28. By pulling on the handle 68 the lugs 66 and 67 are pulled clear of the back ends of the wings 26 and 27 of the locking pawl 23 so that the ratchet lever 42 may then be pulled upwards and after getting to the position of FIG. 3 may be moved further into the position marked in FIGS. 4 and 5 in which the acting ends of the brackets 62 and 63 on the driving pawl 58 are taken up into the grooves 19 and 20 of the cam faces on the front ends of the sides 7 and 8 of the u-cross section. The cam faces 70 and 71 on the inner ends of the ratchet lever 42 then have the effect of clearing the locking pawl 23 from the tooth means 38 and 39 of the strap drum 28 so that the same may now be freely turned. The free end 37 of the strap 2 is then threaded upwards through the gap 35 between the two half cylinders 29 and 30 and then the driving pawl 68 is pulled back once again and the ratchet lever 42 is moved back in a direction opposite to the direction S into its starting position with the driving faces of the brackets 62 and 63 loosely slipping over the tooth flanks 41. Once the lower faces of the lugs 66 and 67 have got as far as the top faces of the wings 26 and 27 this motion comes to an end. On moving back the ratchet lever the cam faces 70 and 71 are at the same time moved clear of the wings 26 and 27 so that the wings come up against the tooth means 38 and 39 on the strap drum stopping it from being turned with the ratchet lever when same is moved back. The ratchet lever is then moved along in the tensioning direction S with the front ends of the brackets 62 and 63 keeping their positions on the tooth flanks 40 so that the strap drum is moved counter-clockwise in terms of FIGS. 2 to 4. The motion of the ratchet lever in the tensioning direction S is limited by the upwardly running part 18 on the sides 7 and 8 of the u-cross section inasfar as the acting parts of the brackets come to rest at this point. By pushing the ratchet lever 42 backwards and forwards between this position and the position in which the lower parts of the lugs 66 and 67 or hooks come up against the top sides of the wings 26 and 27, the tensioning operation is undertaken so that the strap 2 is coiled or wound up on the strap drum 28 as marked in broken lines in FIG. 2. (When tensioning it is naturally not necessary for the lever 42 to be moved as far as it will go over the full angle range between the two end positions as noted). Once all the slack of the strap 2 has been taken up there is a sharp increase in the force needed for moving the connection 69 to take up more strap. Once this force has gone over a given value, that is to say once the turning force of the ratchet lever 42 acting on the strap drum 28 is higher than a given level, the ratchet lever 42 will give way and be folded about the axis M—M, because in this event the force will be over the value $F_m$, and there will be slip and the coupling or clutch formed by the tooth means 79 and 80 between the outer parts 47a and 48a on the one hand and the inner parts 47b and 48b of the arms 47 and 48 on the other hand. Because in this respect the sleeve 88 is slipped in the direction of the arrow 97, the bell tongue 94 will be vibrated and so take effect on the wall 95 of the sounding or bell body 96 so that a warning sound will be produced and it will be clear that the torque is over the limiting value. Once this has taken place the ratchet lever 42 is moved back into the position to be seen in FIG. 2 and moved downwards till the lugs 66 and 67 or hooks have locked onto the wings 26 and 27 of the locking pawl 23. When the slots 24 and 25 and furthermore the slots 59 and 60 are at an acute angle to each other, as marked in FIG. 2, it will not be necessary for the handle 68 to be moved back, because the shutting or folding up motion as such is responsible for sliding the lower sides of the lugs 66 and 67 on the top sides of the wings 26 and 27 till they are at the back end thereof. At this stage, or possibly even before backward motion of the ratchet lever 42, the folded outer parts 47a and 48a are moved back into their starting position so that they are again in line with the inner parts 47b and 48b as viewed in FIG. 2.

To undo the strap the tensioner is opened out by pulling back the handle 68 till it is in the position to be seen in FIGS. 4 and 5, the cam faces 70 and 71 then forcing the locking pawl 23 back so that the strap drum 28 may be freely turned and the loose end of the strap payed out.

Some especially useful effects of the design detailed herein are that there is an efficient limiting of the torque and when such torque is produced a warning sound is produced. Furthermore because the locking pawl 23 and driving pawl 58 are locked together in the locked condition of the tensioner, the same is unlikely to be unlocked by some chance event, as for example because of vibration. Moreover the different parts of the tensioner may be replaced separately. Because of such properties the tensioner may well be used under rough conditions.

Figure 9:
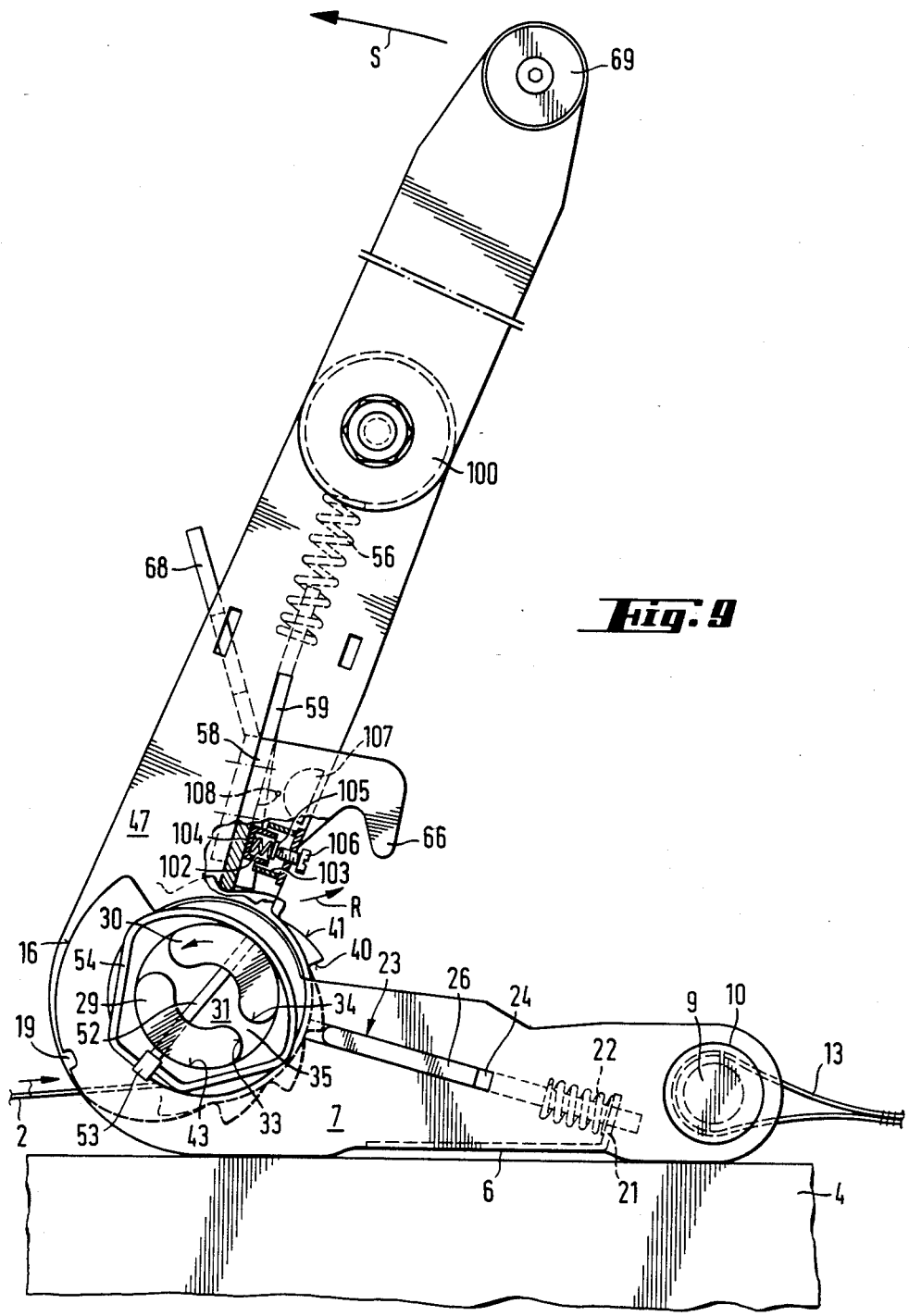
FIG. 9 is an end-on view on the same lines as that of FIG. 3 of a further working example of the tensioner with springs as means for limiting torque, the same elastically pre-loading the driving pawl of the ratchet lever in a direction tangential in relation to the strap drum.

The working example of the tensioner to be seen in FIG. 9 is the same first example as detailed but for the fact that the means for limiting the torque are different; wherein the arms 47 and 48 of the ratchet lever 42 are placed within the sides 7 and 8 of the u-section and the round disks 31 and 32 are placed in the space between the arms 47 and 48 and the acting edge of the brackets 62 and 63 are designed running out past the arms 47 and 38 into the slots therefor. The arms 47 and 48 are furthermore made in one piece and in place of the mechanism 55 there is only one cross piece joining the arms 47 and 48. The slots 59 and 60 running to the side in the arms 47 and 48 radially towards the strap drum 28 are, however, unlike the first working example made with wedge like parts becoming wider, with the purpose of making it possible for the front ends of the driving pawl 58 and for this reason the part thereof acting on the tooth means 38 and 39 of the strap drum 28 to be so rocked round in the direction of arrow R that there is slipping of the teeth. Up till a certain torque value this slip is countered because a spring 102, whose pre-loading effect may be adjusted, takes effect against the lower side of the acting bracket 58 to keep the same in its normal position viewed in FIG. 9. The spring is taken up in a housing 103 that is joined with the arms 47 and 48 of the ratchet 42. In the housing there is a spring cage 104 that is guided for motion in the length direction and is fixed to the lower side of the driving pawl 58. The pre-loading effect of the spring is adjusted by a plate 105 resting against the lower side of the spring and able to be moved along the housing 103 by screw 106. On the arms 47 and 48 there is, furthermore, a sounding or resonant body 107 with a bell function. The body 107 acted upon by a bell torque 108 joined to the lower said of the driving pawl 58 when, upon tensioning with the ratchet lever 42, the force of the teeth faces 40 on the point of touching of the driving pawl 58 becomes greater then the opposite force 102 caused by the spring, thus causing motion of the driving pawl in the direction of the arrow R as noted hereinbefore.

I claim as my invention:

1. A strap tensioner, particularly for stowing loads, comprising: a strap (2), anchoring means for a fixed end (13) of said strap (2), a strap drum (28), a ratchet mechanism comprising ratchet wheels (38, 39) placed at each side of said strap drum (28), a drive pawl (58) and a stop pawl (23) cooperating with said ratchet wheels (38, 39), spring means for urging said drive pawl and said stop pawl in the direction of said ratchet wheels, a ratchet lever (42) which is pivoted about the axis of said strap drum, wherein said drive pawl is movably mounted on said ratchet lever characterized in that said ratchet lever (42) is divided into inner and outer parts (47a, 47b, 48a, 48b) said parts being linked together by an axle (73), wherein each part is connected to a pair of tooth means (79, 80) which are pivotally mounted on said axle, and wherein at least one of said tooth means (79, 80) is axially movable with respect to the other tooth means, said pair of tooth means being tensioned against each other by means of an actuating spring (86), and wherein said strap drum (28) is actuated by said ratchet mechanism in said tensioning direction and is prevented from being overloaded by the pivotal movement of said inner and outer parts about said axle.

2. The tensioner as claimed in claim 1, wherein the tension of the actuating spring (86) is adjustable.

3. The tensioner as claimed in claim 1 or 2, wherein the ratchet lever (42) is composed of two levers (47, 48) arranged parallel to each other at both sides of the strap drum (28), and wherein the axle (73) is extending between the two levers (47, 48).

4. The tensioner as claimed in claim 1, characterized in that the ends of the axle (73) have a polygonal cross-section fitting into respective cutouts of the outer parts (47a, 48a) of the ratchet lever (42), said axle having a part with a cylindrical cross-section, wherein a first tooth means (80) is pivotally mounted upon an extension of said part, and wherein said part is fitted into a respective cutout of an inner part (74b) of the ratchet lever (42), a second tooth means (79) having an inner surface matched with the polygonal cross-section of the axle (73) is slidingly mounted on said part of said axle (73) having a polygonal cross-section, and wherein spring means (86) are provided for tensioning the tooth means (79, 80) against each other.

5. The tensioner as claimed in claim 4, wherein the spring means comprises plate springs (86) mounted on the axle (73).

6. The tensioner as claimed in claim 5, wherein the plate springs (86) are tensioned by a counter element (81) which is slidingly mounted on the axle (73) and is axially adjustable by means of a screw thread (89).

7. The tensioner as claimed in claim 1, wherein an acoustic warning device (94, 95, 96, 107, 108) is actuated by one of the tooth means (79).

8. The tensioner as claimed in claim 7, wherein a tongue (94) is springingly connected with one of the tooth means (79) and is acting against a sounding body (96) placed between the arms (47, 48) of the ratcher lever (42).

9. The tensioner as claimed in claim 8, wherein the sounding body (96) is centered on the axle (73).

10. The tensioner as claimed in claim 1, characterized in that flanks (98′) of the tooth means (79, 80) acting in a tensioning direction are steeper than flanks (99′) acting in an opposite direction.

11. The tensioner as claimed in claim 1, characterized in that the frame of the anchoring means is formed by a U-shaped piece of sheet metal, two upturned flanges of which constitute arms (7, 8) of said anchoring means.

12. A strap tensioner, particularly for stowing loads, comprising: a strap (2), an anchoring means for a fixed end (13) of said strap (2), a strap drum (28), a ratchet mechanism comprising ratchet wheels (38, 39) placed at each side of said strap drum (28), a drive pawl (58) and a stop pawl (23) cooperating with said ratchet wheels (38, 39), spring means for urging said drive pawl and said stop pawl in the direction of said ratchet wheels, a ratchet lever (42) which is pivoted about the axis of said strap drum, wherein said drive pawl is movably mounted on said ratchet lever characterized in that said drive pawl (58), in addition to being movable in a direction substantially radial to the ratchet wheels (38, 39) is also movable in a direction tangential to the circumference of said ratchet wheels with respect to the ratchet lever, and a tangential spring means (102) for urging said drive pawl (58) in a tangential tensioning direction of the strap drum (28) so that said drive pawl may rotate in said tangential direction against the urging of said tangential spring means so as to prevent overloading of said strap, and wherein said strap drum (28) is actuated by said ratchet mechanism in said tensioning direction.

13. The tensioner as claimed in claim 12, wherein the bias of the tangential spring means (102) is adjustable.

14. The tensioner as claimed in claim 12, characterized in that said drive pawl (58) is guided in a slot of the ratchet lever (47, 48) which is extending substantially parallel to the longitudinal axis of said lever, and wherein the end of the slot adjacent to the strap drum (28) is widened to allow for a certain movement of the drive pawl (58) in a direction tangential to the circumference of the strap drum, such that a spring (102) is inserted between an end of the drive pawl (58) and the ratchet lever (47, 48).

15. The tensioner as claimed in claim 14, wherein the tangential spring means (102) at the side of the ratchet level (47, 48) is held by a counterplate (104) whose position is adjustable by a set screw (106).

* * * * *